(12) United States Patent
Ishii et al.

(10) Patent No.: US 7,623,489 B2
(45) Date of Patent: Nov. 24, 2009

(54) PACKET TRANSMISSION CONTROL APPARATUS AND PACKET TRANSMISSION CONTROL METHOD

(75) Inventors: Hiroyuki Ishii, Yokosuka (JP); Takehiro Nakamura, Yokosuka (JP); Akihito Hanaki, Yokohama (JP); Yoshimasa Imamura, Yokohama (JP); Shinya Tanaka, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 858 days.

(21) Appl. No.: 11/019,443

(22) Filed: Dec. 23, 2004

(65) Prior Publication Data

US 2005/0163111 A1 Jul. 28, 2005

(30) Foreign Application Priority Data

Dec. 24, 2003 (JP) ............................ P2003-428372

(51) Int. Cl.
 *H04W 4/00* (2009.01)
(52) U.S. Cl. ........................................ 370/329; 370/468
(58) Field of Classification Search ........................ None
 See application file for complete search history.

(56) References Cited

U.S. PATENT DOCUMENTS

| | | | | |
|---|---|---|---|---|
| 7,133,380 B1 * | 11/2006 | Winters et al. | ............... | 370/329 |
| 7,206,296 B2 * | 4/2007 | Miyoshi et al. | ............. | 370/328 |
| 7,248,606 B2 * | 7/2007 | Sato | ............................ | 370/524 |
| 7,317,700 B2 * | 1/2008 | Hwang | ........................ | 370/328 |
| 7,324,472 B2 * | 1/2008 | Dottling et al. | ............. | 370/328 |
| 2003/0104817 A1 | 6/2003 | Damnjanovic | | |
| 2003/0123403 A1 * | 7/2003 | Jiang | ........................... | 370/328 |
| 2003/0193906 A1 | 10/2003 | Andrews et al. | | |
| 2004/0218545 A1 * | 11/2004 | Pedersen | ..................... | 370/252 |
| 2005/0163072 A1 * | 7/2005 | Park et al. | ..................... | 370/328 |
| 2006/0045010 A1 * | 3/2006 | Baker et al. | .................. | 370/230 |
| 2007/0116024 A1 * | 5/2007 | Zhang et al. | ................. | 370/412 |

FOREIGN PATENT DOCUMENTS

| | | |
|---|---|---|
| JP | 2002-152228 | 5/2002 |
| JP | 2002-171287 | 6/2002 |
| JP | 2003-218882 | 7/2003 |
| JP | 2003-259437 | 9/2003 |
| WO | WO 02/085054 A2 | 10/2002 |
| WO | WO 02/085061 A1 | 10/2002 |
| WO | WO 03/039085 A1 | 5/2003 |

OTHER PUBLICATIONS

U.S. Appl. No. 11/579,992, filed Nov. 9, 2006, Ishii, et al.
Jack M. Holtzman, "CDMA Forward Link Waterfilling Power Control", pp. 1663-1667, IEEE VTC 2000 Spring.

(Continued)

*Primary Examiner*—Bob A Phunkulh
(74) *Attorney, Agent, or Firm*—Oblon, Spivak, McClelland, Maier & Neustadt, L.L.P.

(57) ABSTRACT

A packet transmission control apparatus is configured to perform transmission control of packets to a plurality of mobile stations. The packet transmission control apparatus includes an acquirer configured to acquire a scheduling frequency which shows a frequency of scheduling of packets to each mobile station in a predetermined period, and a scheduler configured to control scheduling of packets to each mobile station in accordance with an acquired scheduling frequency.

10 Claims, 10 Drawing Sheets

OTHER PUBLICATIONS

"3$^{rd}$ Generation Partnership Project; Technical Specification Group Radio Access Network; Physical layer aspects of UTRA High Speed Downlink Packet Access (Release 4)", pp. 1-89, 3GPP Organizational Partners (ARIB, CWTS, ETSI, TI, TTA, TTC), 3GPP TR 25.848 v4.0.0 (Mar. 2001).

"3$^{rd}$ Generation Partnership Project 2 "3GPP2" cdma 2000 High Rate Packet Data Air Interface Specification", 3GPP2 C.S0024 Version 2.0, 2000.

Yoshiaki Ohta, et al., "Framework for fair scheduling schemes in the next generation high-speed wireless links", IEICE Technical Report, vol. 103, No. 123, Jun. 12, 2003, pp. 25-30 and 2 cover pages. (with English Abstract).

Kapseok Chang, et al., "QOS-Based Adaptive Scheduling for a Mixed Service in HDR System", IEEE Personal, Indoor and Mobile Radio Communications Symposium, XP 010611598, vol. 4, Sep. 15, 2002, pp. 1914-1918.

* cited by examiner

FIG. 8

| TYPE # | WHEN TO RENEW $\bar{R}_n$ | CALCULATION METHOD OF $r_n$ |
|---|---|---|
| 1 | AT EVERY TTI WITHIN CONNECTING TIME | SIZE OF PACKET WHOSE DELIVERY COULD BE ACKNOWLEDGED |
| 2 | AT EVERY TTI WITHIN CONNECTING TIME | SIZE OF TRANSMITTED PACKET |
| 3 | AT EVERY TTI WITHIN CONNECTING TIME | SAME AS $R_n$ |
| 4 | AT TTI WHERE SCHEDULING-RELATED CALCULATION IS CARRIED OUT | SIZE OF PACKET WHOSE DELIVERY COULD BE ACKNOWLEDGED |
| 5 | AT TTI WHERE SCHEDULING-RELATED CALCULATION IS CARRIED OUT | SIZE OF TRANSMITTED PACKET |

PACKET TRANSMISSION CONTROL APPARATUS AND PACKET TRANSMISSION CONTROL METHOD

CROSS REFERENCE TO RELATED APPLICATION

This application is based upon and claims the benefit of priority from the prior Japanese Patent Application No. P2003-428372, filed on Dec. 24, 2003; the entire contents of which are incorporated herein by reference.

BACKGROUND OF THE INVENTION

1. Field of the Invention

The present invention relates to a packet transmission control apparatus and a packet transmission control method which perform transmission control of packets to a plurality of mobile stations.

The present invention relates particularly to a packet transmission control apparatus and a packet transmission control method which perform transmission control (scheduling) of downlink packets in a mobile communication system.

2. Description of the Related Art

In a downlink of a mobile communication system, one physical channel can be shared among mobile stations which belong to the radio base station. Hereinafter, the physical channel used in such a case is called a "downlink shared channel".

In this downlink shared channel, the radio base station controls the transmission order of packets to the plurality of mobile stations with which the radio base station communicates, in accordance with an instantaneous radio quality between the radio base station and each mobile station, so as to improve throughput that the radio base station can provide, in other words, a system capacity.

This control of packet transmission order by the radio bass station is called "scheduling". It is known that, by applying the scheduling to packet transmission, channel capacity increases, or communication quality improves.

Generally, it is considered that the conventional scheduling targets on packets in which requirements for transmission delays are not so strict.

Incidentally, with regard to standardization of the third generation mobile communication system, so-called IMT-2000, there are "3GPP/3GPP2 (Third-Generation Partnership Project/Third-Generation Partnership Project 2)". Standard specifications have been developed as "W-CDMA system" in the 3GPP, and standard specifications have been developed as "cdma2000 system" in the 3GPP2.

In the 3GPP, "HSDPA (High Speed Downlink Packet Access)", which is a high-speed packet transmission system in the downlink direction, has been standardized based upon a prospect that high-speed and high-capacity traffic will increase especially in the downlink due to downloading from databases and websites and the like, as the Internet has rapidly expanded in recent years.

Moreover, in the 3GPP2, "1x-EV DO", which is a transmission system only for high-speed data in the downlink direction, has been standardized from the same viewpoint as above. In the "1x-EV DO" of the cdma2000 system, "DO" means "Date Only".

For example, in the HSDPA, a scheme for controlling a modulation scheme and a coding rate of respective radio channels in accordance with the radio condition between each mobile station and a radio base station (this scheme is called, for example, AMCS (Adaptive Modulation and Coding Scheme) in the HSPDA), and the scheduling which is operated in a cycle of few milliseconds, are used in a combination. Thus, it is possible to improve throughput for individual mobile stations as well as throughput of the entire system.

"Round Robin Scheduler" is widely known as a scheduling algorithm in a radio base station. The "Round Robin Scheduler" controls the transmission order of packets waiting for transmission, by assigning the downlink shared channel sequentially to mobile stations (for example, mobile stations #1 to #2 to #3 . . . ) which belong to the radio base station.

Moreover, "Proportional Fairness Scheduler" and "Max C/I (Maximum C/I) Scheduler" are known as scheduling algorithms in a radio base station. The "Proportional Fairness Scheduler" and the "Max C/I Scheduler" control the transmission order of packets waiting for transmission based upon the radio condition between the radio base station and each mobile station and the average transmission rate of packets to each mobile station.

The "Proportional Fairness Scheduling" is a scheduling algorithm which assigns a transmission queue and also supports fairness amongst the mobile stations, in accordance with instantaneous changes in downlink conditions of the individual mobile stations.

Hereinbelow, the "Proportional Fairness Scheduling" is briefly described with reference to FIG. 1. FIG. 1 is a flowchart showing the operation of the "Proportional Fairness Scheduler" mounted on a radio base station.

In the "Proportional Fairness Scheduling", a value of an evaluation function of each mobile station which belongs to the radio base station is calculated based upon the measured radio condition between each mobile station and the radio base station and the measured average transmission rate of packets to each mobile station, and thereafter, a transmission queue is assigned to a mobile station maximizing the value of the evaluation function.

As shown in FIG. 1, in step S1001, the radio base station sets initial values as follows:

n=1 (n: a subscript of a mobile station)

$C_{max}=0$ ($C_{max}$: a maximum value of an evaluation function $C_n$)

$n_{max}=0$ ($n_{max}$: a subscript of the mobile station maximizing the value $C_n$ of the evaluation function)

In step S1002, the radio base station measures elements required in calculating the value $C_n$ of the evaluation function, specifically, an instantaneous radio condition $R_n$ between the radio base station and each mobile station #n, and an average transmission rate $\overline{Rn}$ of packets to each mobile station #n.

In step S1003, the radio base station calculates the value $C_n$ of the evaluation function, by using the values measured in the step S1002, according to the following equation.

$$Cn = \frac{Rn}{\overline{Rn}}$$

In step S1004, the radio base station determines whether the value $C_n$ of the evaluation function calculated in the step S1003 exceeds a maximum value $C_{max}$ of the evaluation function.

Here, $C_{max}=0$. Therefore, the determination in the step S1004 is YES, and in step S1005, the radio base station sets the value $C_n$ of the evaluation function calculated in the step S1003 at the maximum value $C_{max}$ of the evaluation function, and also sets "1" at "$n_{max}$".

Thereafter, in step S1006, the radio base station increments "n" by "+1", and determines whether "n" exceeds "N (the number of mobile stations communicating with the radio base station)" in step S1007.

Where "n" does not exceed "N", the operation repeats the steps from S1002 to S1006, thus obtaining N values of the evaluation function sequentially.

In step S1008, the radio base station selects a mobile station #$n_{max}$ maximizing the value $C_n$ of the evaluation function, and assigns a transmission queue to the mobile station #$n_{max}$.

A radio base station, on which the "Proportional Fairness Scheduler" is mounted, assigns a transmission queue to each mobile station #n while downlink quality (radio condition) is relatively good. Therefore, higher throughput can be expected in comparison with a radio base station with the "Round Robin Scheduler" mounted thereon.

Furthermore, in the "Proportional Fairness Scheduling", the radio condition between the radio base station and each mobile station is divided by the average transmission rate of packets to each mobile station, thus lowering the value of the evaluation function of a mobile station with a high average transmission rate. Thus, the transmission queue can be assigned with high fairness in terms of time, compared to the "MAX C/I Scheduling" as describe later.

Meanwhile, the "MAX C/I Scheduling" is a scheduling algorithm which assigns a transmission queue to a mobile station with the best downlink quality (radio condition) amongst mobile stations which belong to the radio base station.

In other words, in the "MAX C/I Scheduling", the same processing as that of the "Proportional Fairness Scheduler" is carried out except that the evaluation function $C_n$ in the processing of the "Proportional Fairness Scheduler" is set so that "$C_n = R_n$".

In the case of the "MAX C/I Scheduler", a transmission queue is assigned to a mobile station with good downlink quality at the beginning of a scheduling cycle.

Normally, a transmission rate of respective packets becomes higher depending on the quality of a link. Therefore, in the "MAX C/I Scheduling", a transmission opportunity is provided to a mobile station with the highest transmission rate.

However, in the "MAX C/I Scheduler", few transmission opportunities are provided to a mobile station with poor average downlink quality, such as a mobile station located remotely from the radio base station, This causes a problem in that throughput obtained at each mobile station is extremely different from one another.

In other words, the "MAX C/I Scheduler" causes a situation where a mobile station located in the vicinity of the radio base station can obtain extremely good throughput, whereas the remaining mobile stations obtain low throughput.

As described so far, in the conventional mobile communication system, the scheduling has been carried out by setting the above-mentioned evaluation function in consideration of the type of service provided and priority related to the type of service, based upon the "Round Robin Scheduler", the "Proportional Fairness Scheduler", or the "MAX C/I Scheduler".

Generally, a scheduling algorism is evaluated based on two criteria which are "fairness in terms of time" and "high cell throughput by user diversity gain".

Here, among the above three types of schedulers, the "Proportional Fairness Scheduler", which can realize "fairness in terms of time" and "high cell throughput by user diversity gain", is considered.

The "Proportional Fairness Scheduler" uses an evaluation function of $$Cn = \frac{Rn}{\overline{Rn}}$$

in which its numerator is an "instantaneous transmission rate of packets to the mobile station #n (instantaneous radio condition with the mobile station #n)", and its denominator is an "average transmission rate of packets to the mobile station #in". Thus, the "Proportional Fairness Scheduler" operates so that the probability of scheduling packets to the above mobile station, whose instantaneous transmission rate is larger than the above average transmission rate, becomes higher.

Packets are scheduled to a mobile station which has high instantaneous radio quality, even when the average transmission rate of the mobile station is large or small. Therefore, the "Proportional Fairness scheduler" can realize both "fairness in terms of time" and "high cell throughput by user diversity gain".

However, the operation of the conventional "Proportional Fairness Scheduler" is based on the assumption that the range of changes in radio quality is the same in all mobile stations.

In the case where the radio quality of a first mobile station changes within a large range and the radio quality of a second mobile station changes within a small range, the probability of scheduling packets to the second mobile station becomes low since the value of the evaluation function of the second mobile station is constantly small. Thus, there has been a problem in that fairness in terms of time cannot always be provided by the conventional "Proportional Fairness Scheduler".

In other words, the conventional "Proportional Fairness Scheduler" is easy to schedule packets to a mobile station whose radio quality changes are large, but is hard to schedule packets to a mobile station whose radio quality changes are small. Therefore, there has been a problem in that fairness in terms of time cannot always be provided by the conventional "Proportional Fairness Scheduler".

For example, in the case where there are two mobile stations whose radio qualities are equal, the changes in the radio quality of the first mobile station is large and the change in the radio quality of the second mobile station is small, the conventional "Proportional Fairness Scheduler" tends to schedule packets to the first mobile station, comparing to the second mobile station. As a result, the conventional "Proportional Fairness Scheduler" cannot realize fairness in terms of time.

The followings are examples of considerable cases where the radio quality of the mobile station does not change:

the case where the mobile station is in a stationary state;

the case where the mobile station is in a multipass environment (the case where a pass diversity exists):

the case where the mobile station is in use of a receive diversity process, an equalizer or the like.

It is explained, by referring to FIG. 2, that the radio quality changes of a mobile station becomes small when the mobile station is in use of a receive diversity process. As shown in FIG. 2, the radio qualities which change without correlation are combined by the mobile station which uses a receive diversity process and therefore the radio quality changes are reduced.

BRIEF SUMMARY OF THE INVENTION

In viewing of the foregoing, it is an object of the present invention to provide a packet transmission control apparatus and a packet transmission control method which can realize fairness in terms of time while operating the conventional "Proportional Fairness Scheduler".

A first aspect of the present invention is summarized as a packet transmission control apparatus which performs transmission control of packets to a plurality of mobile stations. The packet transmission control apparatus includes an acquirer configured to acquire a scheduling frequency which shows a frequency of scheduling of packets to each mobile station in a predetermined period, and a scheduler configured to control scheduling of packets to each mobile station in accordance with an acquired scheduling frequency.

A second aspect of the present invention is summarized as a packet transmission control method for performing transmission control to packets to a plurality of mobile stations. The method includes acquiring a scheduling frequency which shows a frequency of scheduling of packets to each mobile station in a predetermined period, and controlling scheduling of packets to each mobile station in accordance with an acquired scheduling frequency.

BRIEF DESCRIPTION OF THE SEVERAL VIEWS OF THE DRAWINGS

FIG. 8 is a view for explaining an operation of a mobile station transmission rate calculating unit of the MAC-hs processing unit within the base band signal processing unit in the radio base station according to the first embodiment of the present invention.

DETAILED DESCRIPTION OF THE INVENTION

A First Embodiment of the Present Invention

<Configuration of Packet Transmission Control Apparatus According to the First Embodiment of the Present Invention>

The configuration of a packet transmission control apparatus according to a first embodiment of the present invention is described below, with reference to the drawings.

Figure 1:
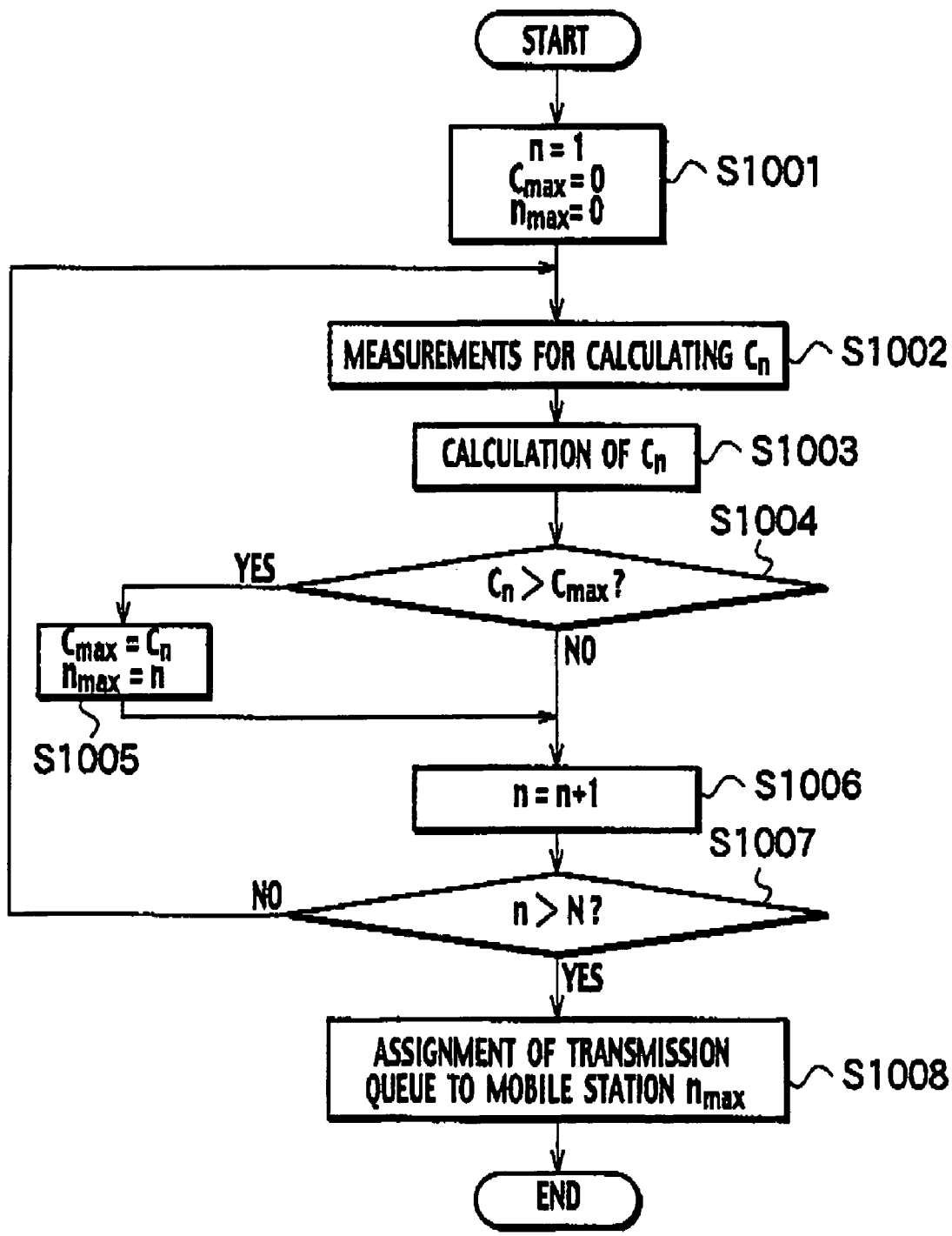
FIG. 1 is a flowchart showing an operation of an MAC-hs processing unit within a base band signal processing unit in a radio base station according to a prior art.
Figure 2:
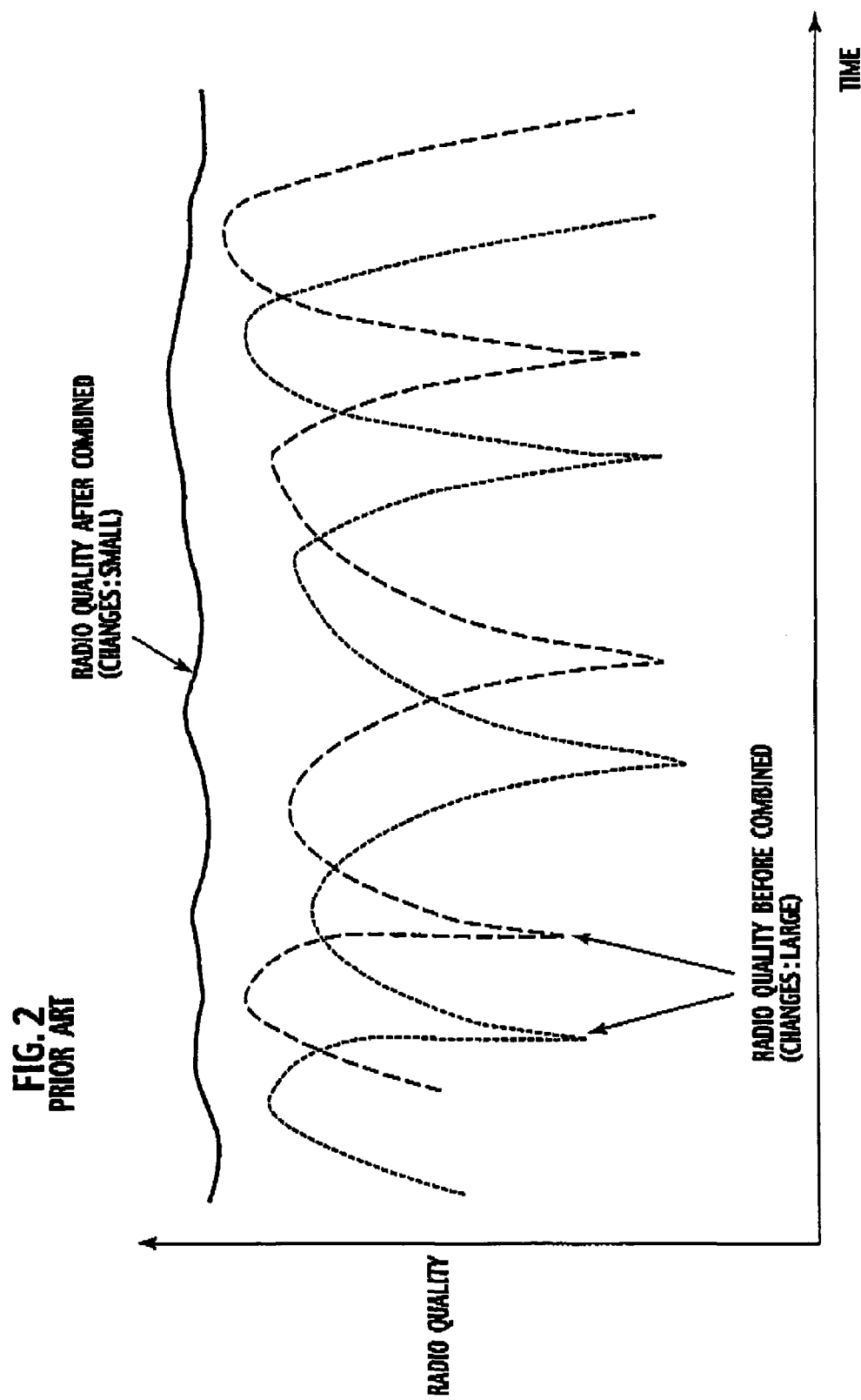
FIG. 2 is a view for explaining reduction in changes of a radio quality of a mobile station which uses a receive diversity press in a scheduler according to the prior art.
Figure 3:
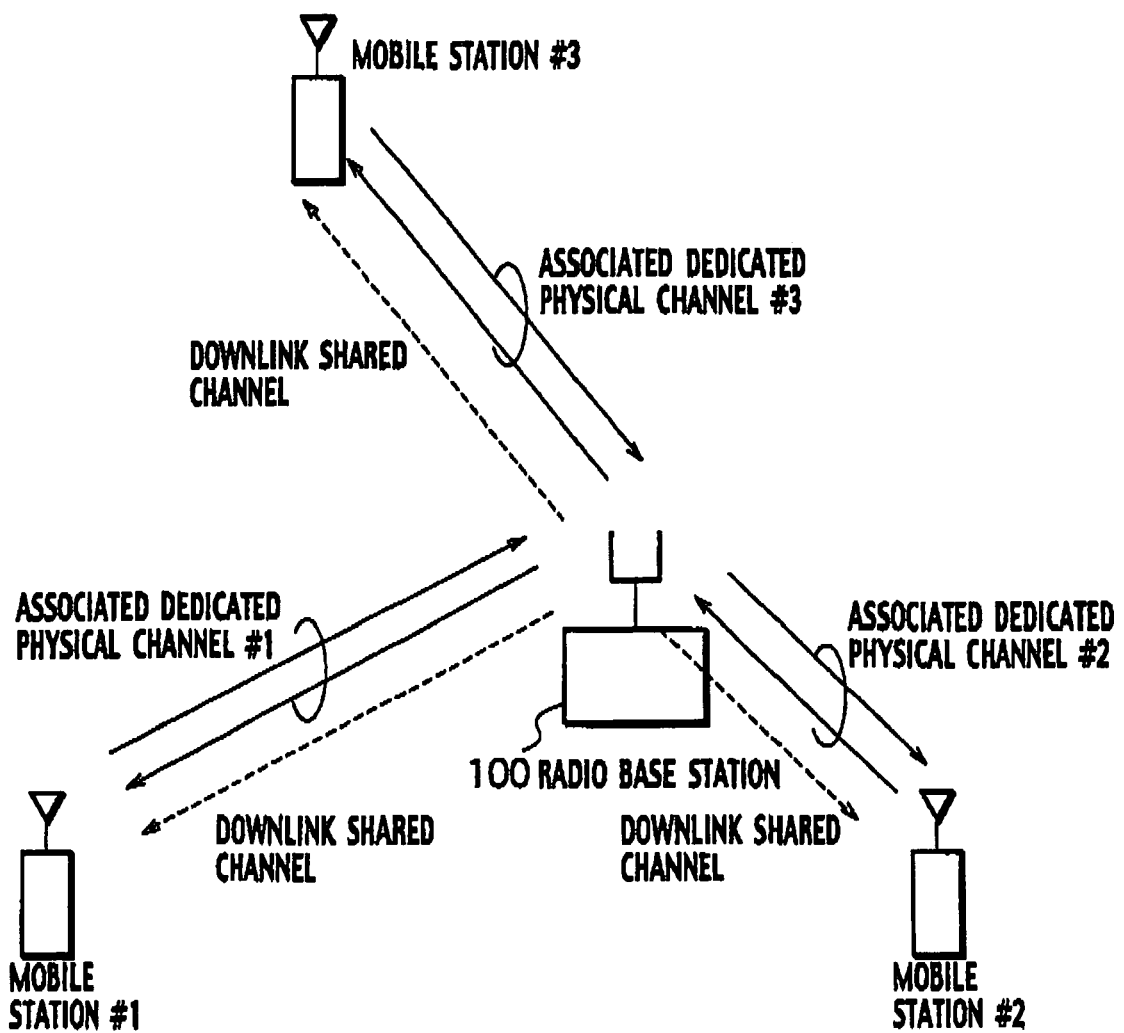
FIG. 3 is a view of the entire configuration of a mobile communication system according to a first embodiment of the present invention.

FIG. 3 is a view showing an example of the configuration of a mobile communication system in which the packet transmission control apparatus is provided according to the first embodiment of the present invention is provided.

In FIG. 3, this mobile communication system is configured with a radio base station 100 and a plurality of mobile stations #1 to #3, and employs the "HSDPA". In the first embodiment, description is given regarding an example where the above-described packet transmission control apparatus is provided in the radio base station 100.

In downlink packet transmission in the "HSDPA", used are a downlink shared channel (DSCH) or a high speed-DSCH (HS-DSCH), and associated dedicated physical channels #1 to #3 (bidirectional channels in uplink and downlink directions) associated with a physical channel (DSCH or HS-DSCH). Each of the associated dedicated physical channels #1 to #3 is assigned to the individual mobile stations #1 to #3, respectively.

In the uplink directions of the dedicated physical channels (DPCCH, DPDCH, HS-DPCCH) #1 to #3, transmitted are not only user data, but also pilot symbols, transmission power control commands (TPC commands) for transmission of downlink associated dedicated physical channels, downlink quality information used for scheduling of the shared channel and AMCS (Adaptive Modulation and Coding Scheme), and the like.

On the other hand, in the downlink directions of the associated dedicated physical channels #1 to #3, transmission power control commands TPC commands) for transmission of the uplink associated dedicated physical channels and the like are transmitted.

In the first embodiment, the respective mobile stations #1 to #3 have the same configuration and function. Therefore, they are described as the mobile station(s) #n (n≧1) unless otherwise specified.

Figure 4:
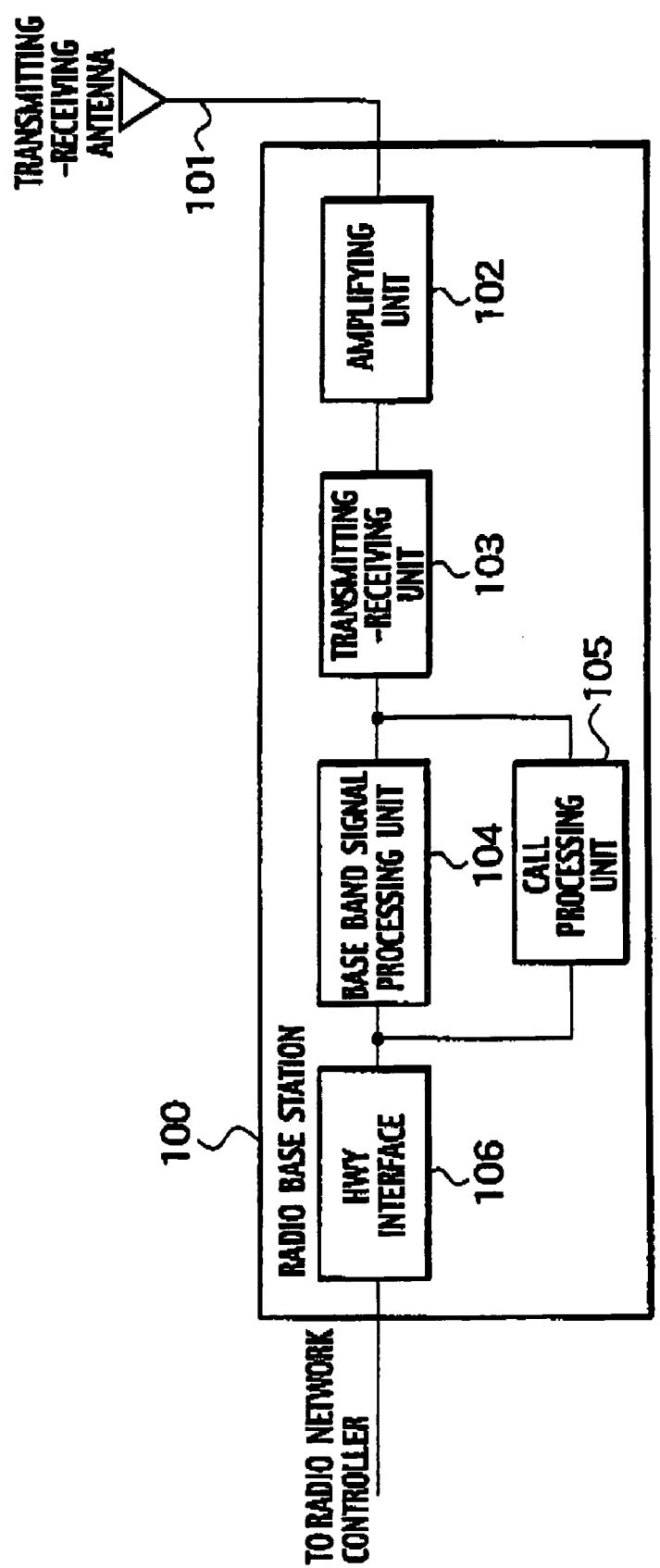
FIG. 4 is a functional block diagram of a radio base station according to the first embodiment of the present invention.

FIG. 4 is a functional block diagram showing an example of the configuration of the radio base station 100 shown in FIG. 3. In FIG. 4, the radio base station 100 includes a transmitting-receiving antenna 101, an amplifying unit 102, a transmitting-receiving unit 103, a base band signal processing unit 104, a call processing unit 105, and an HWY interface 106.

The transmit-receive antenna 101 is configured to transmit a downlink radio frequency signal containing the downlink shared channel, downlink associated dedicated physical channels #1 to #3, and the like, to the respective mobile stations #1 to #3. The transmit-receive antenna 101 is also configured to receive an uplink radio frequency signal containing the uplink associated dedicated physical channels #1 to #3 and the like, from the respective mobile stations #1 to #3.

The amplifying unit 102 is configured to amplify the downlink radio frequency signal outputted from the base band signal processing unit 104, and to transmit the amplified signal to the transmit-receive antenna 101.

The amplifying unit 102 is also configured to amplify the uplink radio frequency signal from the transmit-receive antenna 101, and to transmit the amplified signal to the base band signal processing unit 104.

The transmitting-receiving unit 103 is configured to transmit a base band signal to the bass band signal processing unit 104. The base band signal is obtained by converting the frequency of the uplink radio frequency signal outputted from the amplifying unit 102.

The transmitting-receiving unit 103 is configured to transmit the downlink radio frequency signal to the amplifying unit 102. The downlink radio frequency signal is obtained by converting the frequency of the base band signal, outputted from the base band signal processing unit 104, into a radio frequency band.

The base band signal processing unit 104 is configured to provide downlink packets, outputted from the HWY interface, with retransmission control (HARQ (Hybrid ARQ)) processing, scheduling processing, transmission format and resource selecting processing, error-correction coding processing, spreading processing and the like, and then transfers the packets to the transmitting and receiving unit 103.

The base band signal processing unit 104 is also configured to provide the base band signal, outputted from the transmitting-receiving unit 103, with despreading processing, RAKE combining processing, error-correction decoding processing, and the like, and transfers the signal to the HWY interface 106.

Figure 5:
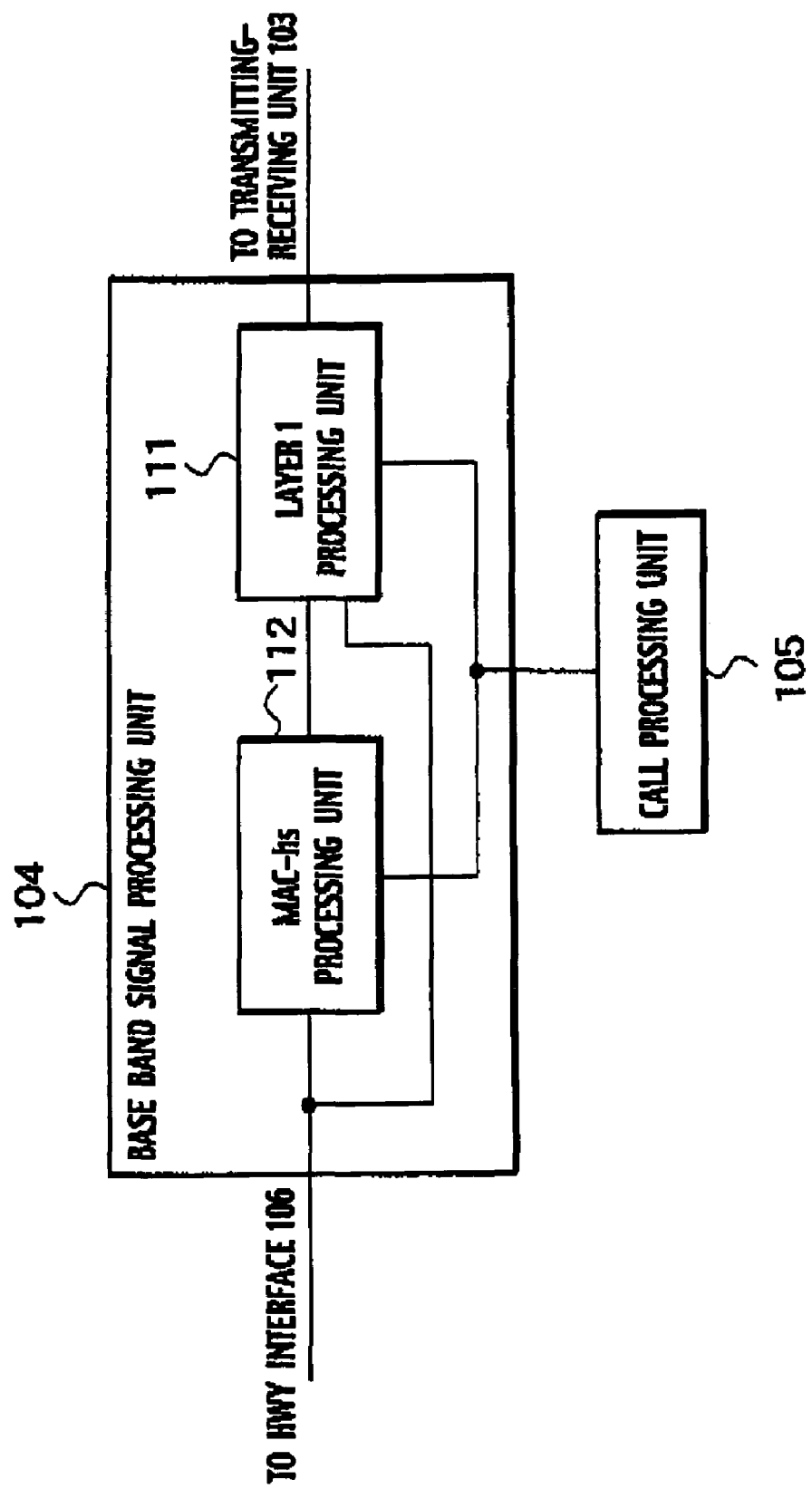
FIG. 5 is a functional block diagram of a base band signal processing unit in the radio base station according to the first embodiment of the present invention.

FIG. 5 shows the functional configuration of the base band signal processing unit 104. Specifically, as shown in FIG. 5, the base band signal processing unit 104 includes a layer 1 processing unit 111 and an MAC-hs (Medium Access Control-HSDPA) processing unit 112. Both of the layer 1 processing unit 111 and the MAC-hs processing unit 112 are connected to the call processing unit 105.

The layer 1 processing unit 111 is configured to provide the downlink packets with error-correction coding processing and spreading processing, to provide the uplink packets with despreading processing, error-correction decoding process and RAKE combining processing, and to provide the associated dedicated physical channels in both directions with transmission power control processing.

Further, the layer 1 processing unit 111 is configured to receive information indicating a downlink radio condition. This information is reported, being carried on a control bit field specifically for an uplink dedicated physical channel from each mobile station. The layer 1 processing unit 111 then outputs the information to an evaluation function calculating unit 190 of the MAC-hs processing unit 112.

Here, the information indicating the radio condition include, for example, instantaneous receipt SIR (signal-to-interference ratio), BLER (Bit Error Rate), CQI (Channel Quality Indicator) and the like.

The MAC-hs processing unit 112 is configured to provide retransmission control (HARQ) processing of the downlink shared channel in HSDPA, scheduling processing for packets waiting for transmission, and transmission format and resource selection processing.

Figure 6:
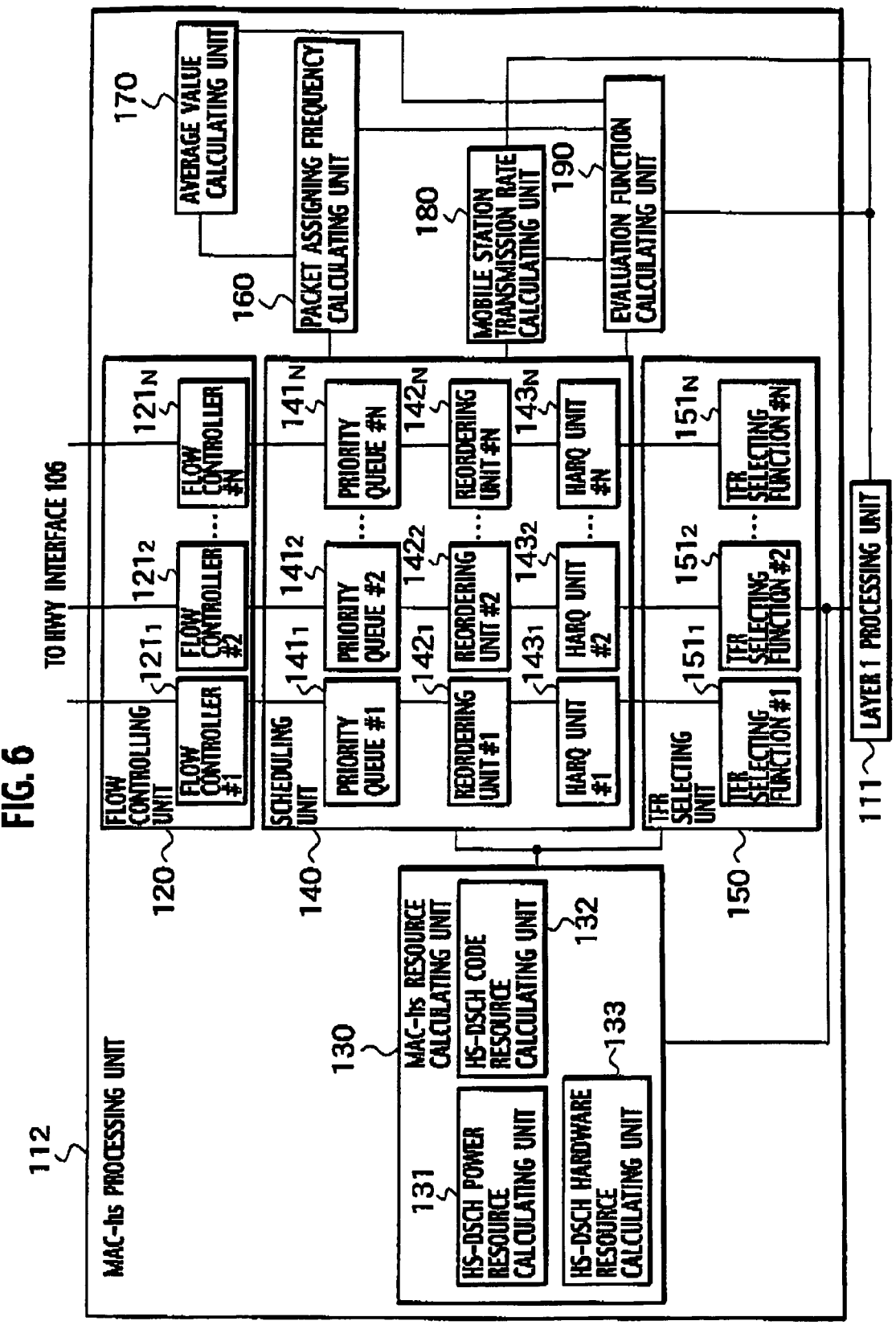
FIG. 6 is a functional block diagram of an MAC-hs processing unit within the base band signal processing unit in the radio base station according to the first embodiment of the present invention.

FIG. 6 shows the functional configuration of the MAC-hs processing unit 112. As shown in FIG. 6, the MAC-ha processing unit 112 includes a flow controlling unit 120, an MAC-hs resource calculating unit 130, a scheduling unit 140, a TFR (transmission format and resource) selecting unit 150, a packet assigning frequency calculating unit 160, an average value calculating unit 170, a mobile station transmission rate calculating unit 180, and the evaluation function calculating unit 190.

The flow controlling unit 120 includes a plurality of flow controllers (#1 to #N) $121_1$ to $121_N$, and has a function of adjusting a transmission rate of downlink packets, which has been received from a radio network controller through the HWY interface 106, based upon a capacity of an implemented transmission queue (buffer) and the like.

The respective flow controllers (#1 to #N) $121_1$ to $121_N$ monitor the flow of downlink packets. Once the flow of downlink packets increase, and the free space in the transmission queue (buffer) is reduced, the flow controllers $121_1$ to $121_N$ perform processing for suppressing the volume of packets to be transmitted.

Note that the flow controls (#1 to #N) $121_1$ to $121_N$ correspond to connections #1 to #N between the radio base station and the mobile stations #1 to #N, respectively.

The MAC-hs resource calculating unit 130 is configured to calculate radio resources (a power resource, a code resource, a hardware resource and the like) to be assigned to HS-DSCH, and to include an HS-DSCH power resource calculating unit 131 which calculates the power resource, an HS-DSCH code resource calculating unit 132 which calculates the code resource, and an HS-DSCH hardware resource calculating unit 133 which calculates the hardware resource.

The scheduling unit 140 is configured to provide downlink packets to be transmitted to each mobile station, with scheduling processing.

As described later, in the first embodiment, the scheduling unit 140 is configured to control the scheduling of packets to the respective mobile stations based upon scheduling frequency which shows a frequency of scheduling of packets to the respective mobile stations in a predetermined period.

The scheduling unit 140 may be configured to control the scheduling of packets to the respective mobile stations #n based upon the respective scheduling frequencies and an average value of the scheduling frequencies amongst the mobile stations #n.

The scheduling unit 140 may also be configured to control the scheduling of packets to the respective mobile stations based upon a first parameter for controlling fairness of opportunity for scheduling of packets to mobile stations, the respective scheduling frequencies, and the average value of the scheduling frequencies.

As described later, the scheduling unit 140 provides scheduling processing for downlink packets to be transmitted to each mobile station, based upon the evaluation function related to each mobile station. The evaluation function is calculated by the evaluation function calculating unit 190.

Specifically, the scheduling unit 140 selects a mobile station #n maximizing the value $C_n$ of the evaluation function amongst the respective mobile stations. Thereafter, the scheduling unit 140 assigns a priority queue 141 to the mobile station #n (that is, the scheduling unit 140 carries out assignment of downlink transmission).

As shown in FIG. 6, the scheduling unit 140 has N priority queues (#1 to #N) $141_1$ to $141_N$, N reordering units (#1 to #N) $142_1$ to $142_N$, and N HARQ units (#1 to #N) $143_1$ to $143_N$.

The priority queues (#1 to #N) $141_1$ to $141_N$, the reordering units (#1 to #N) $142_1$ to $142_N$, and the HARQ units (#1 to #N) $143_1$ to $143_N$ correspond to connections #1 to #N between the radio base station and the mobile stations #1 to #N, respectively.

The priority queues (#1 to #N) $141_1$ to $141_N$ are transmission queues provided in the connections, respectively. In other words, the priority queues (#1 to #N) $141_1$ to $141_N$ are configured to accumulate downlink packets until they are selected by the scheduling processing.

Normally, one priority queue is used for one mobile station, However, a plurality of priority queues are used for one mobile station when a plurality of connections are set in one mobile station.

The reordering units (#1 to #N) $142_1$ to $142_N$ are configured to give sequence numbers to downlink packets so that the mobile station #n can execute receiving order control processing for the downlink packets in the retransmission control processing using HARQ. The reordering units (#1 to #N) $142_1$ to $142_N$ also perform window control processing to prevent a receive buffer overflow in the mobile station #n.

The HARQ units (#1 to #N) $143_1$ to $143_N$ are configured to perform the retransmission control processing by using a stop-and-wait protocol ARQ of M process, based upon ACK/NACK feedback in the uplink direction.

An example of the operation of the stop-and-wait protocol ARQ performed in the HARQ units (#1 to #N) $143_1$ to $143_N$ is described with reference to FIG. 7.

Figure 7:
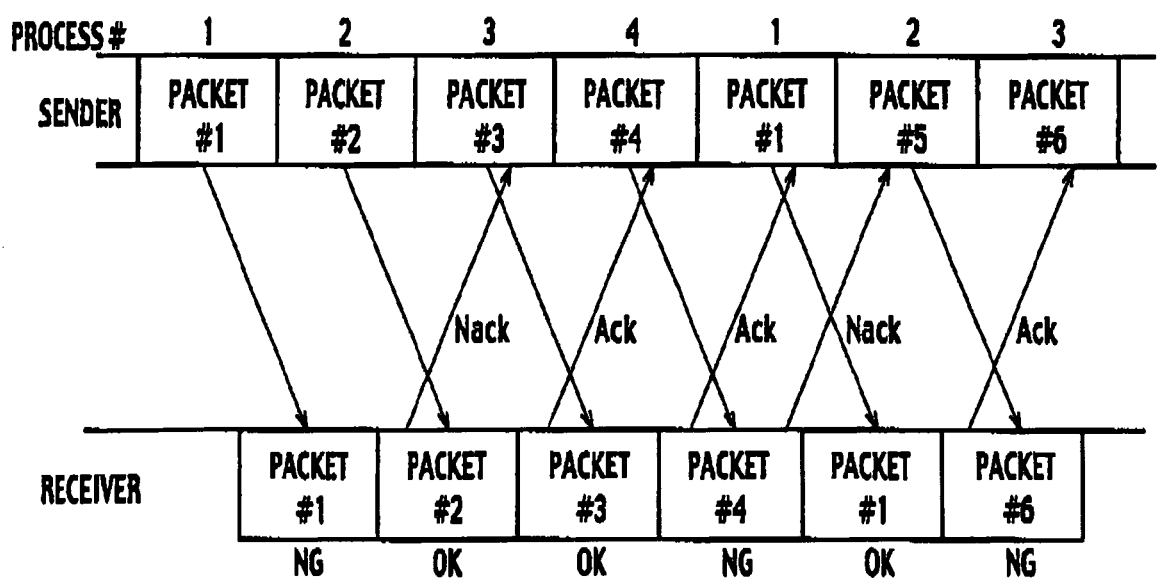
FIG. 7 is a view for explaining an operation of an HARQ unit of the MAC-hs processing unit within the base band signal processing unit in the radio base station according to the first embodiment of the present invention.

As shown in FIG. 7, in the stop-and-wait protocol ARQ, a receiver receives packets from a sender and then returns transmission acknowledgements (ACK/NACK) to the sender.

In the example of FIG. 7, the receiver could not receive a packet #1 correctly and thus returns a negative acknowledgement (NACK) to the sender. Meanwhile, the receiver could receive a packet #2 correctly, and thus returns an acknowledgement (ACK) to the sender. The receiver repeats the operation of returning ACK or NACK to the sender in the order of received packets.

The TFR selecting unit 150 includes N TFR selecting functions (#1 to #N) $151_1$ to $151_N$. The TFR selecting functions (#1 to #N) $151_1$ to $151_N$ correspond to the connections #1 to #N between the radio base station and the mobile stations #1 to #N, respectively.

The TFR selecting functions (#1 to #N) $151_1$ to $151_N$ are configured to decide a downlink transmission format (a number of codes, a modulation scheme, a coding rate and the like) and radio resources which are used in the respective connections #1 to #N, based upon the CQI which is an indicator of the downlink quality received through an uplink channel, the radio resources (a power resource, a code resource, a hardware resource) to be assigned to HS-DSCH which are calculated in the MAC-hs resource calculating unit 130, and the like.

The respective TFR selecting functions (#1 to #N) $151_1$ to $151_N$ notify the layer 1 processing unit 111 of the decided downlink transmission format and radio resources.

The packet assigning frequency calculating unit 160 is configured to calculate a scheduling frequency (that is, a packet assigning frequency) $f_n$ which shows a frequency of scheduling of packets to the respective mobile stations in a predetermined backward period (measuring period) in the respective mobile stations #n, that is, in each priority queues $141_1$ to $141_N$.

The packet assigning frequency calculating unit 160, for example, calculates the scheduling frequency $f_n(t)$ at time "t" according to the following equation.

$$fn(t) = \tau \cdot fn(t-1) + (1-\tau) \cdot Al_n(t)$$

Here, $Al_n(t)$ becomes "1" when a packet is scheduled to mobile station #n at time "t", and $Al_n(t)$ becomes "0" when a packet is not scheduled to mobile station #n at time "t".

Furthermore, "τ" is a forgetting coefficient to be provided as a parameter. When "τ" is set close to "1", the above measuring period of the scheduling frequencies becomes longer so that the fairness in terms of time can be strengthened. Meanwhile, when "τ" is set shorter, the above measuring period of the scheduling frequencies becomes smaller so that the fairness in terms of time can be weakened.

The packet assigning frequency calculating unit 160 may also be configured to calculate the scheduling frequency $f_n(t)$ at time "t" according to the following equation.

$$fn(t) = \frac{\sum_{\tau=-T}^{t} Al n(\tau)}{T}$$

Here, $AI_n(\tau)$ becomes "1" when a packet is scheduled to mobile station #n at time "t", and $Al_n(\tau)$ becomes "0" when a packet is not scheduled to mobile station #n at time "t".

Furthermore, "T" is a control parameter for controlling the length of the above-described period for measuring the scheduling frequency. When "T" is set large, the above period for measuring the scheduling frequency becomes longer so that the fairness in time period can be strengthened. Meanwhile, when "T" is set small, the above measuring period of the scheduling frequency becomes shorter so that the fairness in time period can be weakened.

The average value calculating unit 170 is configured to calculate an average value F of the scheduling frequencies amongst the mobile stations #n by using the scheduling frequencies $f_n$ of the respective mobile stations #n, which is calculated by the packet assigning frequency calculating unit 160.

The average value calculating unit 170 calculates an average value of the scheduling frequencies amongst the mobile stations #n according to the following equation.

$$F = \frac{\sum_n fn}{n}$$

The average value calculating unit 170 may be configured to calculate a median value, a geometry average value, a harmonic average value or a mode value in scheduling frequencies in a plurality of mobile stations #n as an average value F of the scheduling frequencies amongst the mobile stations #n, since one statistic middle value is required on the scheduling frequencies in a plurality of mobile stations #n.

The mobile station transmission rate calculating unit 180 is configured to calculate an average transmission rate of downlink packets to the mobile station #n, according to (Equation 1).

$$\overline{Rn}(t) = \delta \cdot \overline{Rn}(t-1) + (1-\delta) \cdot \gamma n \tag{1}$$

Where δ is a predetermined parameter which designates a section where averaging processing is performed, and also indicates a forgetting factor ($0 \leq \delta \leq 1$) for the averaging processing. By controlling δ, the level of fairness provided by the scheduler can be controlled.

For example, when the value of δ is set at "0.9999", the section where the average transmission rate of packets to each mobile station are calculated becomes larger than a section obtained when the value of δ is set at "0.99". As a result, fairness amongst the mobile stations over a long period of time is taken into consideration, thus operating the scheduler with high fairness in terms of time.

Conversely, if the section where the average transmission rate of packets to a mobile station is reduced, in other words, if the value of δ is reduced, fairness amongst the mobile stations in a short period of time is taken into consideration. Hence, it becomes possible to operate the scheduler with low fairness in terms of time.

This parameter δ can be set for downlink packets within the priority queues $141_1$ to $141_N$, based upon the service types, the contract types, the terminal types, the cell types, the priority classes and the like.

In the above (Equation 1), $r_n$ represents an instantaneous transmission rate of packets to a mobile station #n.

The instantaneous transmission rate $r_n$ of packets to the mobile station #n is any one of the following: a size (data size) of packets, the delivery acknowledgment of which from the mobile station #n has been received; a size of packets transmitted to the mobile station #n; and a size of transmittable packets calculated (estimated) based upon the radio condition $R_n$ between the radio base station and the mobile station #n.

The mobile station transmission rate calculating unit 180 is configured to renew the average transmission rate of packets at each predetermined transmission time interval or at each time interval at which the evaluation function used for scheduling of packets is calculated.

The mobile station transmission rate calculating unit 180 is also configured to calculate the instantaneous transmission rate $r_n$ of the packets, which is used for renewal of the average transmission rate of the packets.

For example, the mobile station transmission rate calculating unit 180 is configured to renew the average transmission rate of packets in the patterns of the types #1 to #5 as shown in FIG. 8.

In the pattern of the type #1, the mobile station transmission rate calculating unit 180 renews the average transmission rate of packets, by calculating the size of packets, the delivery acknowledgement of which from the mobile station #n has been received, at every TTI (transmission time interval).

In the pattern of the type #2, the mobile station transmission rate calculating unit 180 renews the average transmission rate of packets, by calculating the sizes of packets transmitted to the mobile station #n, at every TTI.

In the pattern of type #3, the mobile station transmission rate calculating unit 80 renews the average transmission rate of packets, by calculating the size of transmittable packets calculated (estimated) based upon the radio condition $R_n$ between the radio base station and the mobile station #n, at every TTI.

In the pattern of type #4, the mobile station transmission rate calculating unit 180 renews the average transmission rate of packets, by calculating to size of packets, the delivery acknowledgement of which from the mobile station #n has been received. The size of the packets is calculated at each time interval at which the evaluation function used for scheduling of packets is calculated.

In the pattern of type #5, the mobile station transmission rate calculating unit 180 renews the average transmission rate of packets, by calculating the size of packets transmitted to the mobile station #n. The size of the packets is calculated at each time interval at which the evaluation function used for scheduling of packets is calculated.

The mobile station transmission rate calculating unit 180 may also be configured to obtain the instantaneous transmission rate $r_n$ of packets to the mobile station #n, by a method apart from the above.

For example, after the mobile station #n starts communicating, the mobile station transmission rate calculating unit 180 can measure the data size of packets in a data link layer, in each predetermined period, so as to obtain the instantaneous transmission rate $r_n$ of packets to the mobile station #n.

Then, the packets are addressed to the mobile station #n, and the packets are flown into the MAC-hs processing unit 112.

In such a case, the MAC-hs processing unit 112 is required to have a function of measuring the transmission rate of the packets in the data link layer. The evaluation function calculating unit 190 is configured to calculate the value $C_n$ of the evaluation function used in the scheduling processing performed by the scheduling unit 140.

The call processing unit 105 is configured to transmit and receive call processing signals to/from the radio network controller located in the upper position of the radio base station 100. The call processing unit 105 it also configured to manage the condition of the radio base station 100, and to assign the radio resources to the radio base station 100. The HWY Interface 106 is configured to serve as an interface between the radio network controller and the radio base station 100.

The HWY interface 106 is configured to transfer downlink packets received from the radio network controller to the base band signal processing unit 104, and to transfer uplink packets received from the base band signal processing unit 104 to the radio network controller.

<Operation of Packet Transmission Control Apparatus According to the First Embodiment>

Figure 9:
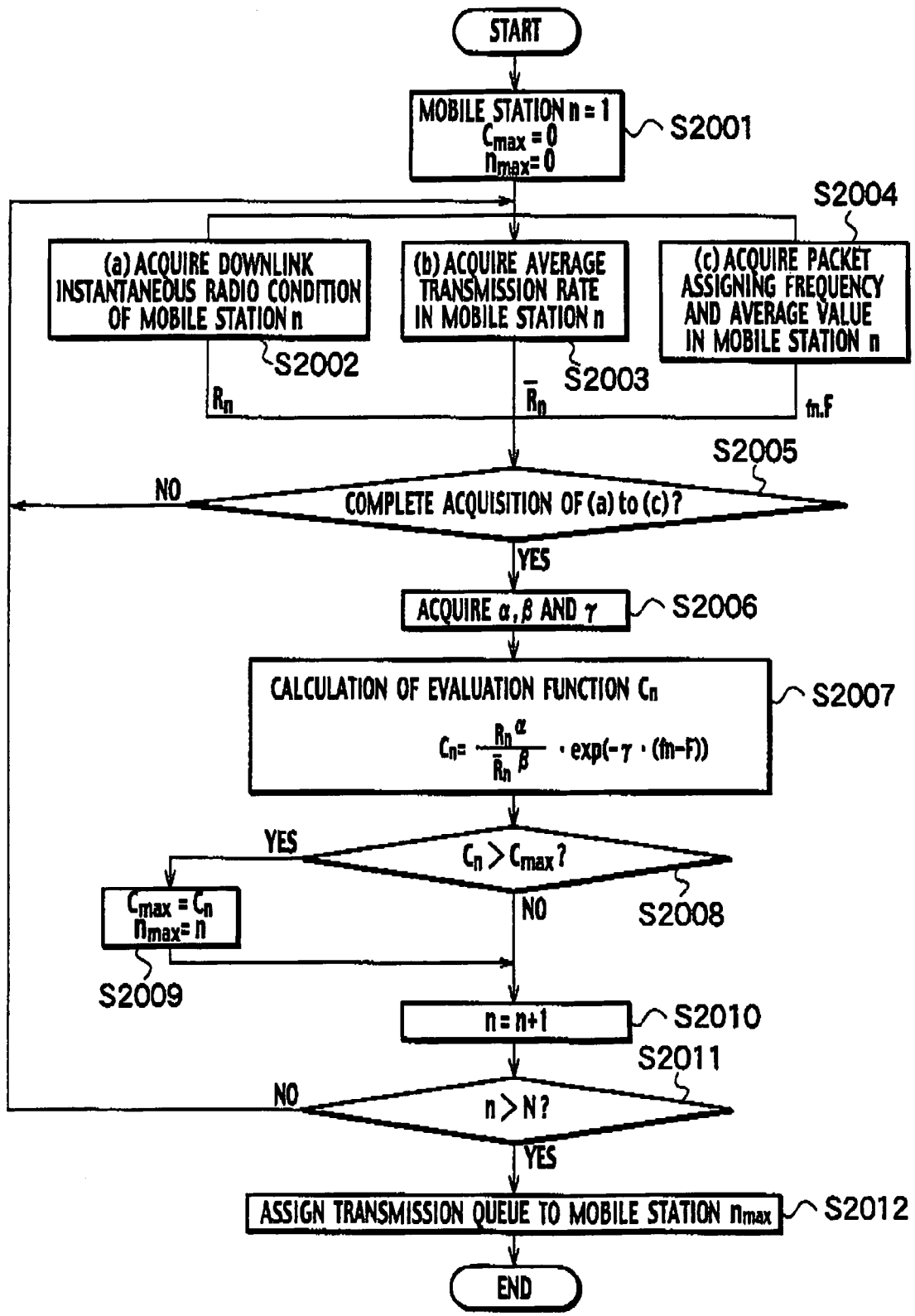
FIG. 9 is a flowchart showing an operation of the MAC-hs processing unit within the base band signal processing unit in the radio base station according to the first embodiment of the present invention.

Described with reference to FIG. 9 is the operation of the packet transmission control apparatus according to the first embodiment, more specifically, the operation of the scheduling processing for downlink packets in the MAC-hs processing unit 112.

As shown in FIG. 9, in step S2001, the evaluation function calculating unit 190 sets initial values for calculation of the evaluation function related to each mobile station #n.

Specifically, the evaluation function calculating unit 190 sets "n=1", "$C_{max}=0$", and "$n_{max}=0$" as the initial values. Here, "n" represents a subscript of the mobile station, "$C_{max}$" represents a maximum value of the evaluation function, and "$n_{max}$" represents a subscript of a mobile station maximizing the value of the evaluation function.

In step S2002, the evaluation function calculating unit 190 acquires an instantaneous radio condition $R_n$ in the downlink between the radio base station and the mobile station #n, or a size (data size) of transmittable packets estimated based upon the radio condition $R_n$, from the layer 1 processing unit 111.

Note that "the size of transmittable packets estimated based upon the radio condition $R_n$" means a size of packets estimated as transmittable packets at a predetermined error rate, based upon CQI indicating downlink quality, an instantaneous SIR of a downlink transmission channel, the radio resources calculated by the MAC-hs resource calculating unit 130 and to be assigned to HS-DSCH, and the like.

In step S2003, the evaluation function calculating unit 190 acquires, from the mobile station transmission rate calculating unit 180, an average transmission rate
$\overline{Rn}$ of downlink packets to the mobile station #n.

In step S2004, the evaluation function calculating unit 190 acquires, from the packet assigning frequency calculating unit 160, a scheduling frequency $f_n$ which shows a frequency of scheduling implemented, in past times, to packets within the priority queue (#n) $141_n$ assigned to the mobile station #n, and acquires, from the average value calculating unit 170, an average value F of the scheduling frequencies amongst the mobile stations #n.

In step S2005, the evaluation function calculating unit 190 determines whether all information in the steps S2002 to S2004 is acquired.

Where it is determined that all information is acquired (where the answer is "YES" in the step S2005), this operation proceeds to step S2006. Otherwise (where the answer is "NO" in the step S2005), the evaluation function calculating unit 190 attempts to acquire information which has not been acquired.

In step S2006, the evaluation function calculating unit 190 receives "index parameters α, β and γ", designated remotely, through the call processing unit 105, and then calculates the value $C_n$ of the evaluation function according to the following equation in step S2007.

$$Cn = \frac{Rn^\alpha}{\overline{Rn}^\beta} \cdot \exp(-\gamma \cdot (fn - F)) \quad (2)$$

Once the value $C_n$ of the evaluation function is calculated as described above, the evaluation function calculating unit 190 determines whether the calculated value $C_n$ of the evaluation function is the maximum value in step S2008.

Currently, "$C_{max}=0$ (the initial value)". Thus, in step S2009, the evaluation function calculating unit 190 sets the value $C_n$ of the evaluation function, measured in the step S2007, as $C_{max}$ and sets the subscript "n" of the mobile station #n corresponding to $C_{max}$, as $n_{max}$.

In step S2010, the evaluation function calculating unit 190 increments the value of "n" by "+1", in order to calculate the value $C_{n+1}$ of the evaluation function of the next mobile station #n+1.

In step S2011, the evaluation function calculating unit 190 determines whether the value of "n" exceeds the number "N" of the mobile stations which are communicating with the radio bane station 100.

Where it is determined in the step S2011 that the value of "n" does not exceed the number "N" of the mobile stations (where the answer is "NO" in the step S2011), the loop processing from the steps S2002 to S2010 is repeatedly carried out in this operation until it is determined that the value of "n" exceeds the number "N" of the mobile stations.

As a result, the evaluation function calculating unit 190 can calculate the values $C_n$ of the evaluation function with respect to all the mobile stations communicating with the radio base station 100.

On the other hand, where it is determined in the step 2011 that the value of "n" exceed the number "N" of the mobile stations (where the answer is "YES" in the step S2011), the evaluation function calculating unit 180 instructs the scheduling unit 140 to assign a transmission queue to the mobile station #$n_{max}$ which corresponds to $n_{max}$ set in the step S2009.

<Operational Effect of Packet Transmission Control Apparatus According to the First Embodiment>

According to the packet transmission control apparatus of the first embodiment, the scheduling unit 140 controls the scheduling of packets to the respective mobile stations #n based upon the scheduling frequency $f_n$ which shows the frequency of scheduling of packets to the respective mobile stations #n in a predetermined period, regardless of the range of changes in the radio quality $R_n$. Thus, fairness in terms of time can be realized over an operation of the conventional "Proportional Fairness Scheduler".

Specifically, according to the packet transmission control apparatus of the first embodiment, it is possible to provide a scheduler which can provide equalization in the scheduling opportunities, by calculating the scheduling frequency in each priority queue $141_n$ which is corresponding to the respective mobile station #n, and incorporating an evaluation item exp $(-\gamma \cdot (f_n - F))$ to the evaluation function $C_n$ in the conventional scheduler. The evaluation item is based on the difference between the scheduling frequency $f_n$ and the average value F of the scheduling frequencies $f_n$ among priority queues $141_n$.

Concretely, according to the packet transmission control apparatus of the first embodiment, in the above described (Equation 2), an item exp $(-\gamma \cdot (f_n - F))$ is multiplied to $$Cn = \frac{Rn^\alpha}{\overline{Rn}^\beta}$$

which is typically used in the evaluation function of the "Proportional Fairness Scheduler". Therefore, equalization in the scheduling opportunities can be provided in addition to fairness provided by the "Proportional Fairness Scheduler". Here, the item exp $(-\gamma \cdot (f_n - F))$ is calculated based on the scheduling frequency $f_n$ of the priority queues $141_n$ which are corresponding to the respective mobile stations #n and an average value F of the relevant scheduling frequencies $f_n$ amongst the mobile stations (priority queues $141_n$).

For example, when five mobile stations A1, A2, A3, A4 and A5 exist and their schedule frequencies of a measurement object "TTI (Transmission Time Interval)" are "0.1", "0.2", "0.3", "0.4", and "0.5" respectively in order, more scheduling opportunities need to be provided to the mobile stations A1, A2, A3, A4 and A5 in order. This is because assigning opportunities need to be increased for the mobile stations which have less scheduling opportunities in order to realize fairness in the scheduling opportunity.

Here, the average value of scheduling frequencies among the above five mobile stations A1 to A5 is "0.3". The values of exp $(-\gamma \cdot (f_n - F))$ corresponding to the mobile stations A1 to A5 are "exp(0.2γ)", "exp(0.1γ)", "exp(0.0γ)", "exp(-0.1γ)" and "exp(-0.2γ)" in order. Thus, the value $C_n$ of evaluation function can be set larger to the mobile stations A1, A2, A3, A4 and A5 in order.

Further, according to the packet transmission control apparatus of the first embodiment, the strength of fairness in the scheduling opportunities can be controlled by controlling the parameter (forgetting coefficient) γ.

For example, when the value of γ is set smaller, the difference among the values of exp $(-\gamma \cdot (f_n - F))$ corresponding to the mobile stations A1 to A5 (that are "exp(0.2γ)", "exp(0.1γ)", "exp(0.0γ)", "exp(-0.1γ)" and "exp(-0.2γ)") becomes smaller. Then, the fairness in the scheduling opportunities is weakened.

Meanwhile, when the value of γ is set larger, the difference among the values of exp $(-\gamma \cdot (f_n - F))$ corresponding to the mobile stations A1 to A5 (that are "exp(0.2γ)", "exp(0.1γ)", "exp(0.0γ)", "exp(-0.1γ)" and "exp(-0.2γ)") becomes larger. Then, the fairness in the scheduling opportunities is strengthened.

(Modification)

The packet transmission control apparatus according to the first embodiment may be configured to set parameter γ with respect to each priority class, service type, terminal type, cell type or contract type. The parameter controls the strength of fairness in scheduling opportunities The packet transmission control apparatus according to the first embodiment can provide a scheduler which can provide equalization in the scheduling opportunities by setting predetermined parameters α, β appropriately. The scheduler is, for example, the "Proportional Fairness Scheduler (α=1, β=2)", the "MAX C/I Scheduler (α=1, β~1 (but β≠0))", or the scheduler which is intermediate in features between the "Proportional Fairness Scheduler" and the "MAX C/I scheduler".

In the packet transmission control apparatus of the first embodiment, the evaluation function calculating unit 190 may be configured to use $$\frac{F - fn}{a} + b$$

or $(-a \cdot x2 + a \cdot F2 + b)$ as a substitute for an item $\exp(-\gamma \cdot (f_n - F))$ which is used for equalization of the scheduling opportunities at the evaluation function $C_n$. Here the "a" and "b" may be any constant numbers.

The packet transmission control apparatus according to the first embodiment may be configured to use a scheduler other than the above described scheduler. For example, when a scheduler, whose evaluation function $C_n$ is $$Cn = \frac{Rn^\beta}{\overline{Rn}^\alpha} \cdot Wn^\theta$$

is used, the packet transmission control apparatus according to the first embodiment can change the evaluation function $C_n$ to $$Cn = \frac{Rn^\beta}{\overline{Rn}^\alpha} \cdot Wn^\theta \cdot \exp(-\gamma \cdot (fn - F))$$

so that equalization in the scheduling opportunities can be provided, in addition to the functions of conventional schedulers. Here, α, β and γ are parameters which takes a value within 0 to 1, and $W_n$ indicates residence time of packet at the radio base station 100.

In the first embodiment, one mobile station uses one priority queue. However, one mobile station may use a plurality of priority queues (for example, K pieces of priority queues). In this case, the packet transmission control apparatus according to the first embodiment schedules N×K pieces of priority queues, not N pieces of priority queues.

Further, the evaluation function calculating unit 190 in MAC-hs processing unit 112 is configured to include, for example, a program device which can update programs such as CPU, digital signal processor (DSP), or EPCG. The evaluation function calculating unit 190 stores a program for calculating evaluation function $C_n$ in a predetermined memory, Also, the evaluation function calculating unit 190 may update by downloading predetermined parameters (α, β, δ, γ).

Here, the evaluation function calculating unit 190 may download the predetermined parameters (α, β, δ, γ) from the upper node of the radio base station 100, or may include a terminal I/F to read the predetermined parameters (α, β, δ, γ) directly from the terminal.

Furthermore, each functional block in the MAC-Hs processing unit 112 may be divided by hardware, or may be divided by software in programs of a processor.

A Second Embodiment of the Present Invention

<Packet Transmission Control Apparatus According to the Second Embodiment of the Present Invention>

A packet transmission control apparatus according to the second embodiment of the present invention is described focusing on different points from the packet transmission control apparatus according to the aforementioned first embodiment.

As proposed in, for example, Japanese Patent Laid-Open Publication No. H3-58646, in packet transmission in a packet communication network, it is generally considered that two kinds of priority classes are provided and packets with the first priority are transmitted preferentially over packets with the send priority.

In the second embodiment, the scheduling unit 140 is configured to manage priority classes $PC_n$ related to transmission of packets, for each mobile station #n, and to perform scheduling of packets in accordance with the priority classes $PC_n$. An operation of the packet transmission control apparatus according to the second embodiment is described below with reference to FIG. 10.

Figure 10:
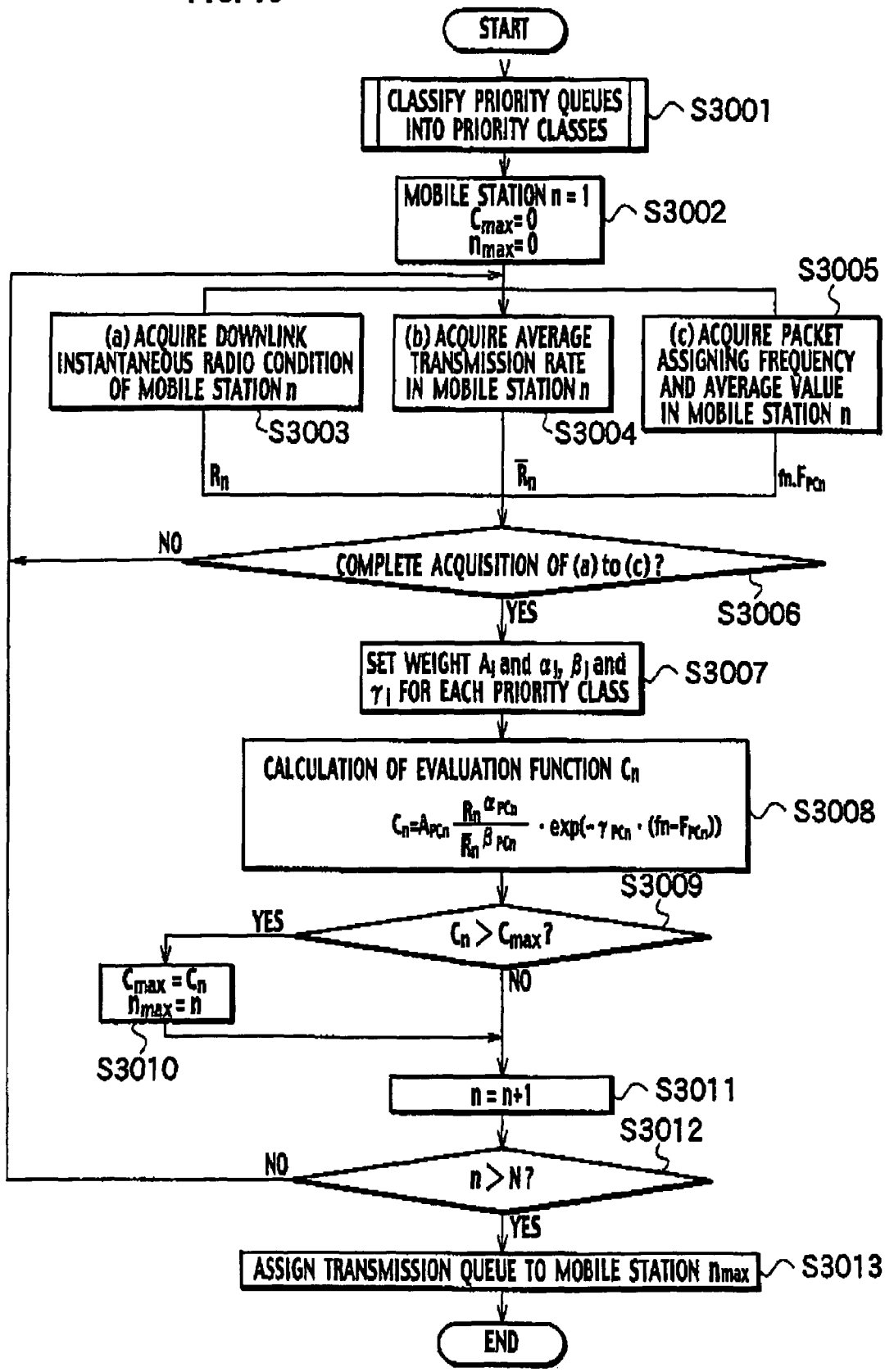
FIG. 10 is a flowchart showing an operation of an MAC-hs processing unit within a base band signal processing unit in a radio base station according to a second embodiment of the present invention.

As shown in FIG. 10, in step S3001, the evaluation function calculating unit 190 of the MAC-hs processing unit 112 classifies the priority queues (#1 to #N) 141$_1$ to 141$_N$ into several priority classes.

The operations from steps S3002 to S3006 is the same as those of the steps S2001 to S2005 shown in FIG. 9.

In step S3006, the evaluation function calculating unit 190 acquires all of Rn, $\overline{Rn}$, fn, $F_{PC}$ required in calculating the value $C_n$ of the evaluation function of the mobile station #n.

Thereafter, in step S3007, the evaluation function calculating unit 190 receives predetermined parameters ($α_1$, $β_1$, and $γ_1$), designated remotely, through the call processing unit 105, and a weighting factor (weight) $A_i$ (where "i" represents a subscript of the priority class of the mobile station #n) set for each priority class. Here, the predetermined parameters ($α_I$, $β_I$, and $γ_I$) and the weighting factor (weight) $A_i$ may be set so that the same values are used in each priority class.

In step 3008, the evaluation function calculating unit 190 calculates the value $C_n$ of the evaluation function based upon the following equation.

$$Cn = A_{PCn} \cdot \frac{Rn^{\alpha PCn}}{\overline{Rn}^{\beta PCn}} \cdot \exp(-\gamma_{PCn} \cdot (fn - F_{PCn}))$$

Here, "$PC_n$" represents the priority class of the mobile station #n. The evaluation function calculating unit 190 is configured to calculate an average value $F_{PCn}$ of the scheduling frequencies in a priority class $PC_n$ to which the mobile station #n belongs, as shown in (Equation 3).

$$F_{PCn} = \frac{\sum_{PCn} fn}{\sum_{PCn} 1} \quad (3)$$

The average value $F_{PCn}$ of scheduling frequencies may be calculated, as described above, in each priority class $PC_n$, or one average value $F_{PCn}$ of scheduling frequencies may be calculated in a plurality of priority classes $PC_n$.

Once the value $C_n$ of the evaluation function is calculated as described above, the evaluation function calculating unit 190 determines whether the calculated value $C_n$ of the evaluation function is a maximum value in step S3009.

Currently, "$C_{max}$=0 (the initial value)". Thus, in step S3010, the evaluation function calculating unit 190 sets the value $C_n$ of the evaluation function, measured in the step S3008, as $C_{max}$, and sets the subscript "n" of the mobile station #n corresponding to $C_{max}$ as $n_{max}$.

In step S3011, the evaluation function calculating unit 190 increments the value of "n" by "+1", in order to calculate the value $C_{n+1}$ of the evaluation function of the next mobile station #n+1.

In step S3012, the evaluation function calculating unit 190 detennines whether the value of "n" exceeds the number "N" of the mobile stations communicating with the radio base station 100.

Where it is determined that the value of "n" does not exceed the number "N" of the mobile stations in the step S3012 (where the answer is "NO" in the step S3012), loop processing from the steps S3003 to S3011 is repeatedly carried out in this operation until it is determined that the value of "n" exceeds the number "N" of the mobile stations.

As a result, the evaluation function calculating unit 190 can calculate the values $C_n$ of the evaluation function of all mobile stations communicating with the radio base station 100.

Meanwhile, where it is determined that the value of "n" exceeds the number "N" of the mobile stations (where the answer is "YES" in the step S3012), the evaluation function calculating unit 190 instructs the scheduling unit 140 to assign a transmission queue to the mobile station #$n_{max}$ which corresponds to $n_{max}$ set in the step S3010.

The packet transmission control apparatus according to the second embodiment not only controls the weighting factor $A_l$ and index parameters $\alpha_l$ and $\beta_l$, in accordance with the priority classes $PC_n$, but also set a parameter $\gamma_l$ for controlling the fairness of the scheduling opportunity in each priority class $PC_n$. Therefore, The scheduling opportunity in each priority class can be equalized and the scheduling opportunity among the priority classes can be equalized. Thus, an appropriate scheduler in accordance with the priority classes can be realized.

For example, in (Equation 3), two priority classes $PC_n$ are provided. The higher priority class $PC_n$ is set as "1" ($PC_n$=1), and the lower priority class $PC_n$ is set as "2" ($PC_n$=2). In this case, by setting them so that "A1>A2", packets to the mobile station #n with the higher priority class are transmitted preferentially. In other words, by causing a difference between A1 and A2 to be sufficiently large, the packets with the higher priority class are always transmitted preferentially.

Further, by setting the index parameters "($\alpha$1, $\beta$1)=(1,1)" and "($\alpha$2, $\beta$2)=(1,0)", the packet transmission control apparatus according to the second embodiment can operate as the "Proportional Fairness Scheduler" for packets with the higher priority class and as the "MAX C/I Scheduler" for packets with the lower priority class.

Moreover, by setting the index parameters "($\delta$1, $\delta$2)= (0.9999, 0.99)", the packet transmission control apparatus according to the second embodiment can control the priority classes as follows: a large averaging section is set for packets with the higher priority class with more consideration of fairness in terms of time; a small averaging section is set for packets with the lower priority class with less consideration of fairness in terms of time.

In the packet transmission control apparatus according to the second embodiment, a mobile station in priority class "1" calculates an evaluation function in use of an average value of the scheduling frequencies amongst the mobile stations in the priority class "1". The mobile station in priority class "2" calculates an evaluation function in use of an average value of the scheduling frequencies amongst the mobile stations in the priority class "2".

Thus, in the packet transmission control apparatus according to the second embodiment, equalization can be provided in the scheduling opportunities amongst the mobile stations which are in the same priority class.

Further, in the packet transmission control apparatus according to the second embodiment, a parameter $\gamma_1$ can be set so as to control the strength of fairness in the scheduling opportunity for each priority class, in addition to the above described controlling for the priority class.

In other words, in the packet transmission control apparatus according to the second embodiment, a parameter $\gamma_1$ in priority class "1", which priority is high, is set "2", and a parameter $\gamma_2$ in priority class "2", which priority is low, is set "1". Therefore, higher equalization in the scheduling opportunity is assured for packets in the priority class "1", and lower equalization in the scheduling opportunity is assured for packets in the priority class "2".

Here, in contrast, in the packet transmission control apparatus according to the second embodiment, a parameter $\gamma_1$ in priority class "1", which priority is high, may be set "1", and a parameter a parameter $\gamma_2$ in priority class "2", which priority is low, may be set "2". Then, lower equalization in the scheduling opportunity may be assured for packets in the priority class "1", and higher equalization in scheduling opportunity is assured for packets in the priority class "2".

(Modification 2)

According to the second embodiment, it is configured that, by changing parameters of the scheduler based on the priority class, a population is set for calculating an average value of scheduling frequencies amongst the mobile stations in each priority class, and the strength of equalization in the scheduling opportunities in the population is changed. However, the present invention is not limited to this.

For example, the packet transmission control apparatus according to the second embodiment defines service types (service classes) so that the parameters of a scheduler is set in accordance with service types, a population is set for calculating an average value of the scheduling frequencies amongst the mobile stations for each service type, and the strength of equalization in the scheduling opportunities in the population is changed, thus an appropriate scheduler can be realized.

Here, the service types classify services for transferring packets with various data size, and include, for example, an image packet transfer service and a voice packet transfer service.

Moreover, the packet transmission control apparatus according to the present invention defines contract types so that the parameters of the scheduler is set in accordance with the contract types, a population is set for calculating an average value of the scheduling frequencies amongst the mobile stations for each contract type, and the strength of equalization in the scheduling opportunities in the population is changed, thus an appropriate scheduler can be realized.

Here, the contract types classify various tariff contracts, and include, for example, a low class contact and a high class contact.

Furthermore, the packet transmission control apparatus according to the present invention defines cell types so that the parameters of the scheduler is set in accordance with the cell types, a population is set for calculating an average value of the scheduling frequencies amongst the mobile stations for each cell type, and the strength of equalization in the scheduling opportunities in the population is changed, thus an appropriate scheduler can be realized.

Here, the call types classify the forms of calls, and include, for example, an indoor or outdoor call, a cell in a suburban or urban district, or a call in a high-traffic region or low-traffic region.

Moreover, the packet transmission control apparatus according to the present invention defines terminal types so that the parameters of the scheduler is set in accordance with the terminal types, a population is set for calculating an average value of the scheduling frequencies amongst the mobile stations for each terminal type, and the strength of equalization in the scheduling opportunities in the population is changed, thus an appropriate scheduler can be realized.

Here, the terminal types classify various terminals, and include, for example, a class based upon identification of a mobile station, types depending on presence/absence or types of a RAKE receiving function, an equalizer, a receive diversity process, an interference canceller and the like, and types depending on terminal capabilities such as a receivable modulation scheme, a code number, and the number of bits.

Description of the embodiments so far was about the HSDPA which is a high-speed packet transmission system in 3GPP. However, the present invention is not limited to the HSDPA, and can be applied to an arbitrary high-speed packet transmission system which performs transmission control (scheduling) of downlink packets in a mobile communication system.

For example, the present invention can be applied to a high-speed packet transmission system such as the high-speed packet transmission systems in the "cdma2000", the "1x-EV DO", the "TDD" in 3GPP2, and the like.

Additional advantages and modifications will readily occur to those skilled in the art. Therefore, the invention in its broader aspect is not limited to the specific details and the representative embodiment shown and described herein. Accordingly, various modifications may be made without departing from the scope of the general inventive concept as defined by the appended claims and their equivalents.

What is claimed is:

1. A packet transmission control apparatus which performs transmission control of packets to a plurality of mobile stations, comprising:
    an acquirer configured to acquire a scheduling frequency which shows a frequency of scheduling of packets to each mobile station in a predetermined period, and
    a scheduler configured to control scheduling of packets to each mobile station in accordance with an average value of the scheduling frequencies amongst the plurality of mobile stations and the scheduling frequency.

2. The packet transmission control apparatus according to claim 1, wherein the scheduler is configured to control the scheduling of packets to each mobile station, in accordance with a first parameter to control fairness of opportunity for scheduling packets to the plurality of mobile stations, the scheduling frequency and the average value of the scheduling frequencies.

3. The packet transmission control apparatus according to claim 2, wherein the acquirer is configured to acquire a radio condition $R_n$ with the mobile station #n and an average transmission rate
$\overline{Rn}$
of the packets to the mobile station #n, and
    the scheduler is configured to schedule the packets to the mobile station #n which has a maximum value of evaluation function $C_n$, which is calculated according to an equation $$Cn = \frac{Rn^{\alpha}}{\overline{Rn}^{\beta}} \cdot \exp(-\gamma \cdot (fn - F))$$

by using the first parameter $\gamma$, the scheduling frequency $f_n$, the average value F of the scheduling frequencies, the radio condition $R_n$ with the mobile station #n, the average transmission rate of packets to the mobile station #n
$\overline{Rn}$
and predetermined parameters $\alpha$ and $\beta$.

4. The packet transmission control apparatus according to claim 1, wherein the scheduler is configured to manage priority classes relating to transmission of the packets to each of the mobile station, and to control the scheduling of packets to each mobile station for each of the priority classes.

5. The packet transmission control apparatus according to claim 4, wherein the acquirer is configured to acquire a radio condition $R_n$ with the mobile station #n and an average transmission rate
$\overline{Rn}$
of the packets to the mobile station #n, and
    the scheduler is configured to schedule the packets to the mobile station #n which has a maximum value of evaluation function Cn, which is calculated according to an equation $$Cn + A_{PCn} \cdot \frac{Rn^{\alpha PCn}}{\overline{Rn}^{\beta PCn}} \cdot \exp(-\gamma PCn \cdot (fn - F_{PCn}))$$

by using an weighting factor $A_{PCn}$ set in accordance with the priority class $PC_n$ related to the mobile station #n, the scheduling frequency $f_n$, the average value $F_{PCn}$ of the scheduling frequencies, the first parameter $\gamma_{PCn}$ to control fairness of opportunity for scheduling packets
$\overline{Rn}$
to the mobile station #n, the average transmission rate of the packets to the mobiles station #n and predetermined parameters $\alpha$ and $\beta$.

6. A packet transmission control apparatus which performs transmission control of packets to a plurality of mobile stations, comprising:
    an acquirer configured to acquire a scheduling frequency which shows a frequency of scheduling of packets to each mobile station in a predetermined period; and
    a scheduler configured to control scheduling of packets to each mobile station in accordance with an average value of the scheduling frequencies amongst the plurality of mobile stations and the scheduling frequency, the scheduling of packet being in further accordance with a first parameter to control fairness of opportunity for scheduling packets to the plurality of mobile stations, the scheduling frequency and the average value of the scheduling frequencies,
    wherein the scheduler is configured to schedule the packets to a mobile station #n which has a maximum value of evaluation function $C_n$, which is calculated according to an equation $$C_n = \exp(-\gamma \cdot (f_n - F))$$

by using the first parameter $\gamma$, the scheduling frequency $f_n$ and the average value F of the scheduling frequencies.

7. A packet transmission control apparatus which performs transmission control of packets to a plurality of mobile stations, comprising:
- an acquirer configured to acquire a scheduling frequency which shows a frequency of scheduling of packets to each mobile station in a predetermined period; and
- a scheduler configured to control scheduling of packets to each mobile station in accordance with an average value of the scheduling frequencies amongst the plurality of mobile stations and the scheduling frequency, the scheduler being configured to manage priority classes relating to transmission of the packets to each of the mobile station, and to control the scheduling of packets to each mobile station for each of the priority classes,
- wherein the scheduler is configured to schedule the packets to the mobile station #n which has a maximum value of evaluation function $C_n$, which is calculated according to an equation $$C_n = A_{PCn} \cdot \exp(-\gamma_{PCn} \cdot (f_n - F_{PCn}))$$

by using an weighting factor $A_{PCn}$ set in accordance with the priority class $PC_n$ related to the mobile station #n, the scheduling frequency $f_n$, the average value $F_{PCn}$ of the scheduling frequencies, and the first parameter $\gamma_{PCn}$ to control fairness of opportunity for scheduling packets to the plurality of mobile stations.

8. The packet transmission control apparatus according to claim 7 or 5, wherein the first parameter is set for each service type, each contract type, each terminal type, each cell type, or each priority class.

9. A packet transmission control apparatus which performs transmission control of packets to a plurality of mobile stations, comprising:
- an acquirer configured to acquire a scheduling frequency which shows a frequency of scheduling of packets to each mobile station in a predetermined period; and
- a scheduler configured to control scheduling of packets to each mobile station in accordance with an average value of the scheduling frequencies amongst the plurality of mobile stations and the scheduling frequency,
- wherein the scheduling frequency $f_n(t)$ at time t relating to the mobile station #n is calculated based upon $$f_n(t) = \tau \cdot f_n(t-1) + (1-\tau) \cdot Al_n(t)$$

by using a determining value $Al_n(t)$ which shows whether or not a packet is scheduled to the mobile station #n at time t and a forgetting coefficient $\tau$.

10. A packet transmission control method for performing transmission control to packets to a plurality of mobile stations, the method comprising:
- acquiring, from an acquirer, a scheduling frequency for each of the plurality of mobile stations, the scheduling frequency being a rate of assigning a number of packets to each mobile station in a predetermined period; and
- controlling, from an scheduler, a scheduling of packets to each mobile station in accordance with an average value of the scheduling frequencies corresponding to t the plurality of mobile stations and the scheduling frequency corresponding to each mobile station.

* * * * *